Aug. 11, 1942.    M. PATTERSON    2,293,009
VERTICAL MIXER
Filed Feb. 7, 1940
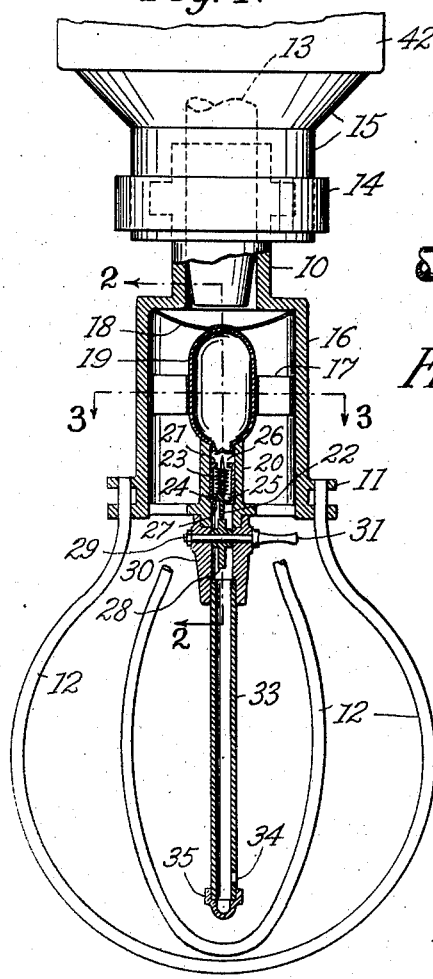
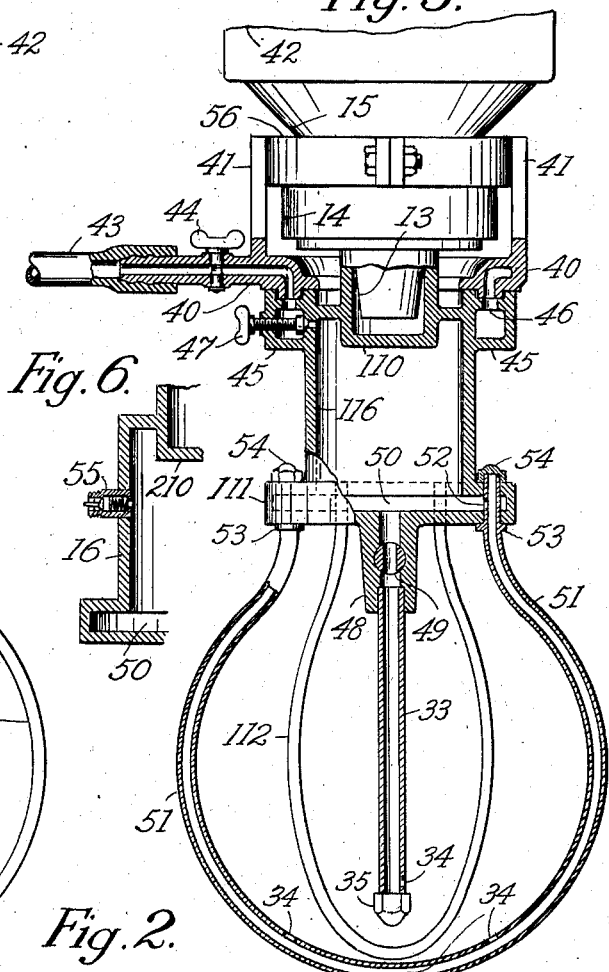
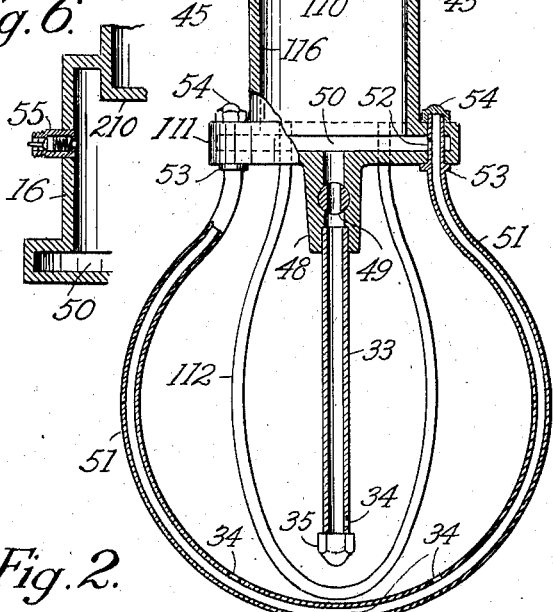
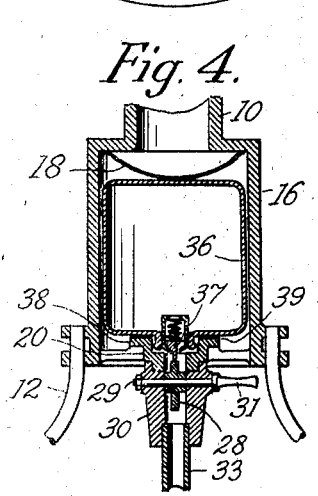
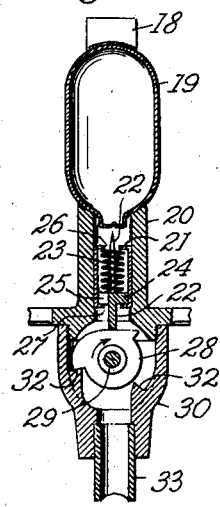
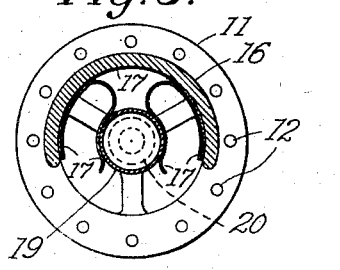
INVENTOR
Morehead Patterson
BY George Hastings
ATTORNEY Patented Aug. 11, 1942

2,293,009

UNITED STATES PATENT OFFICE 2,293,009

VERTICAL MIXER

Morehead Patterson, New York, N. Y., assignor to American Machine & Foundry Company, a corporation of New Jersey Application February 7, 1940, Serial No. 317,679

11 Claims. (Cl. 261—93)

This invention relates to a vertical mixing machine, especially to a rotatable beater mechanism for such a machine, and more particularly to means for aerating the mix during a beating operation.

In carrying on said beating operation it is frequently of advantage to inject a stream of gas into the mix, as for example to obtain a light, fluffy mixture when mixing egg whites and certain cake doughs, and various forms of pumps and other devices have been devised, for the purpose of producing an "air whip" of the ingredients in the mix. However, many known forms of vertical mixers, for example those of the sort illustrated in the patent to Dehuff, No. 1,874,920, granted August 30, 1932, are of a type in which the rotary beater forms part of a beater head by means of which a planetary movement through the dough or other mix is imparted to the beater device, and so far as known to the present applicant, such mixers of the planetary type have not been equipped with means operating through the planetary beater device to aerate the mix, using the term "aerate" inclusively of such known media as air, carbonic acid gas and nitrous oxide.

Under such conditions, it is an object of the present invention to provide a mixing machine of the class described with beating mechanism having means for receiving a supply of aerating fluid in adequate quantities and under suitable pressure from a source outside of the machine, together with means to deliver said supply in controlled quantities adapted to aerate the mix during the beating thereof.

The invention consists, therefore, in providing a receptacle movable bodily with the beater in its various operative positions and constructed and arranged to contain the aerating fluid under pressure, with valve means to permit charging of the receptacle, to retain the charge, and to deliver the gaseous aerating medium, under control, to the mix.

The invention consists further in the provision of a receptacle for the intended use as above set forth, taking the form of a separately filled bottle adapted to contain the gas in a liquefied, or highly compressed, state in combination with means for opening said bottle and for drawing off its contents to a hollow part of the beating mechanism, under control.

The invention consists also in the provision of a mixing machine having a revolving beater head with means to supply an aerating medium to the head from an outer source while the head revolves.

Other objects and features of the invention will appear as the description of the particular physical embodiment thereof selected to illustrate the invention progresses.

In the accompanying drawing, like characters of reference have been applied to corresponding parts throughout the several views which make up the drawing in which:

Fig. 1 is a sectional elevation of beater mechanism for a mixing machine in the construction of which the present invention has been embodied, providing a renewable sealed bottle with a supply of gas for aerating the mix;

Fig. 2 is a view in vertical section upon a larger scale, taken upon the line 2—2 of Fig. 1;

Fig. 3 is a view in horizontal section taken on the line 3—3 of Fig. 1;

Fig. 4 is a fragmentary detail view in vertical section, similar to Fig. 1, showing a modified form of receptacle for a supply of gas, the receptacle being refillable;

Fig. 5 is a view in vertical section, similar to Fig. 1, illustrating another modification in which provision is made of a receptacle for gas derived under pressure from an outside source through flexible connections: and Fig. 6 is a fragmentary detail view in vertical section of a receptacle similar to that shown in Fig. 5, but showing a charging means of the tire-valve type.

Referring to Figs. 1 to 3, 10 is the shank of a mixing machine beater which on a flange 11 carries the beater wires 12 and which is mounted on the spindle 13 and is attached by a coupling 14 to the rotary member 15 of a vertical mixing machine. Above the flange 11, the shank 10 is formed into a chamber 16 which is provided with springs 17 and 18 adapted to receive a bottle 19 and hold the same in position against a central outlet 20 of the chamber 16.

The bottle 19 is of the permanently sealed "sparklet" type containing gas under high pressure which is released therefrom by puncturing the bottle seal by a suitable pin. Into the top portion of outlet 20, immediately below the bottle 19, there is inserted, in spaced position, a housing 21 in which a pin 22 is movable against a spring 23, the flange 24 of the pin and the end surfaces of the housing 21 having openings 25, 26 and 27, respectively, to allow passage of air therethrough. The lower end of pin 22 is engageable by an eccentric disk 28 mounted on a horizontal shaft 29 supported in a nipple 30 of outlet 20 and turnable by a handle 31, the nipple 30 being provided with stop surfaces 32 to limit the movement of the shaft 29 from a low to a high position of disk 28, the said low position corresponding to the inactive position of pin 22 and the said high position to the puncturing and stopping position of the same. To nipple 30 is attached a pipe 33 having one or more orifices 34 at or near its lower end which is provided with a screw plug or cover 35 for convenience in cleaning. Hence, if, upon inserting the bottle 19 into the chamber 16 and coupling the shank 10 to the rotor 15 of the mixer, the handle 31 is turned, the air from bottle 19 will pass into the batch in the mixing bowl and a fluffy mixture will be obtained.

Instead of a permanently sealed, puncture-requiring bottle, a refillable bottle 36, Fig. 4 may be used, the bottle in this case having a valve 37 with which coacts the eccentric disk 28 described hereinbefore. The outlet 20 is made with a flange 38 provided with a resilient lining 39 against which the bottle 36 is pressed by the spring 18, the latter being snapped into position after the neck of bottle 36 has been inserted into outlet 20. With this arrangement, the valve 37 can be closed upon stoppage of the mixer and the remaining air used for the next batch. When the bottle is empty, it can be readily refilled by an ordinary air pump or preferably by holding it against a convenient outlet of a compressed-air system installed in the building or against a reservoir containing gas, such as $CO_2$ under pressure.

In Fig. 5, a flexible compressed gas connection is shown which does not require the use of separate bottles. In this case, an annular gas inlet nozzle 40 is attached by brackets 41 to a split collar 56 embracing the neck 15 of the beater head 42 which in certain types of vertical mixing machines revolves. The outlet 40 has a flexible hose connection 43 to an external source of compressed air controllable by a valve 44. The neck 15 is free to rotate within the split collar 56, in an orbital path about an upright axis remote from the axis of rotation, substantially as indicated in the above mentioned Dehuff Patent #1,874,920.

The chamber 116 of shank 110 is formed at its top with a jacket 45 having an annular opening 46 registering with the opening of inlet 40, the latter resting on jacket 45 when the beater is pushed into position on the rotor 13 of the mixer. A valve 47 controls the communication between the jacket 45 and the chamber 116 and also serves to regulate the amount of air admitted into said chamber. The bottom of chamber 116 is closed and has an outlet 48 provided with a valve 49 to regulate the flow of air into the pipe 33. Chamber 116 can either be filled all in one operation with compressed air by means of valve 47, which is shut off before starting the operation of the beater or valves 44 and 47, can be left slightly open while the beater is in operation to keep the pressure within chamber 116 constant by replenishing the amount of air which is used in aerating the mix.

Gas may also be admitted to the batch in the mixing bowl by one or more of the beater wires 112. In this case, the flange 111 is formed as an annular chamber 50, as shown in Fig. 5, and the gas conducting beater wires 51 are made hollow and provided with orifices 52 within the chamber 50. To permit their cleaning, they are made with flanges 53 and attached to chamber 50 by means of cap nuts 54.

Instead of the permanent gas connection shown in Fig. 5, the chamber 216 of shank 210 may be provided with a tire valve 55, Fig. 6, and gas may be admitted from time to time as needed, by temporarily attaching a pump or a hose from a compressed-gas source to this valve while the beater is at rest.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

What is claimed is:

1. Rotatable beater mechanism for operating upon a mix in a container; said mechanism comprising a beater device adapted to be rotated in said mix, being provided with a hollow part to project into the mix, a refillable receptacle for holding a limited quantity of a fluid under pressure and being adapted to deliver said fluid through said hollow part into said mix, to aerate the same, said receptacle being located in said beater mechanism and adapted to contain said aerating fluid in adequate quantity and under substantial pressure, to effect said aeration of the mix, and valve means operable to permit said receptacle to be charged at will, and to be discharged under control.

2. Apparatus of the character described for aerating a mix comprising a rotatable beater provided with a hollow part to project into the mix, means for holding a limited supply of fluid under pressure located in said beater and rotating therewith, and means adapted to release said fluid gradually through said hollow part into that portion of the mix being acted upon by the beater.

3. Rotatable beater mechanism for operating upon a mix comprising a beating device having a hollow member located in the mix, a self contained fluid pressure receptacle positioned in said rotatable beater to deliver fluid through said hollow member into that portion of the mix being acted upon by the beating device, and means for controlling the rate of delivery of said fluid through said hollow member.

4. Apparatus of the character described for aerating a mix comprising rotatable beater mechanism provided with a hollow part to project into the mix; a pressure capsule, having an outlet portion, for holding a predetermined supply of fluid under pressure located in said beater and rotating therewith; support means for holding said pressure capsule in position; means connecting the outlet portion of said capsule to said hollow member; and means associated with said outlet portion for releasing the fluid contained in said capsule to allow it to escape through said hollow member into the mix to aerate the mix.

5. Apparatus of the character described for aerating a mix comprising rotatable beater mechanism provided with a hollow part to project into the mix, said beater mechanism having a beater acting positively upon the mix, a self contained source for holding a fluid under a substantial amount of pressure located in said beater and rotating therewith, said source being adapted to deliver said fluid through said hollow part directly into that portion of the mix being acted upon by the beater, and means allowing said source to be replenished with additional fluid under pressure.

6. Beater mechanism for operating upon a mix comprising a revolving beating device having a hollow part which projects into the mix and revolves therein, a removable and replaceable reservoir containing a fluid under pressure connected to and revolving with said beater mechanism, said reservoir being adapted to deliver said fluid through said hollow part into the mix.

7. Rotatable beater mechanism for operating upon a mix in a container; said mechanism comprising a beater device adapted to be rotated in said mix, being provided with a hollow part to project into the mix; a reservoir for holding a predetermined supply of gas under pressure substantially greater than atmospheric pressure, said reservoir being located in and rotating with said beater mechanism; and a conduit connecting said reservoir to said hollow part to deliver said supply through said hollow part into the mix to aerate the same.

8. Rotatable beater mechanism for operating upon a mix in a container; said mechanism comprising a beater device adapted to be rotated in said mix, being provided with a hollow part to project into the mix; a compressed air storage receptacle mounted in and adapted to rotate with said beater device for holding a substantial volume of gas under pressure; a duct connecting said reservoir and said hollow part; and means for releasing air gradually from said receptacle through said duct and hollow part into the mix to aerate the same.

9. Rotatable beater mechanism for operating upon a mix in a container; said mechanism comprising a beater device adapted to be rotated in said mix, being provided with a hollow part to project into the mix; a reservoir for holding a supply of gas under pressure located in the beater mechanism and rotating therewith, said reservoir being adapted to deliver said supply through said hollow part into said mix, to aerate the same; and a puncturing element associated with said beater mechanism to release and allow a flow of gas to pass from said reservoir through said hollow part into said mix to aerate the same.

10. Rotatable beater mechanism for operating upon a mix in a container; said mechanism comprising a beater device adapted to be rotated in said mix, being provided with a hollow part to project into said mix; a bottle for holding a predetermined supply of a liquified gas such as $CO_2$ under pressure located in the beater mechanism and rotating therewith; a duct for delivering said supply through said hollow part into said mix, to aerate the same; and means to release the gaseous product to effect said aeration of the mix.

11. Rotatable beater mechanism for operating upon a mix in a container, said mechanism comprising a rotatable beater device provided with a hollow part adapted and arranged to project into the mix, a reservoir for holding a predetermined supply of a fluid, such as carbon dioxide or nitrous oxide, under pressure located in and rotating with said beater mechanism, and means for releasing said gas gradually from said reservoir to allow it to escape through said hollow part directly into that part of the mix being acted upon by said beater device to effect a combined aeration and mixing action at the same time.

MOREHEAD PATTERSON.